United States Patent
Kanatsu et al.

(10) Patent No.: US 6,867,825 B2
(45) Date of Patent: Mar. 15, 2005

(54) LIQUID CRYSTAL DISPLAY DEVICE

(75) Inventors: Tsutomu Kanatsu, Tokyo (JP); Hiroshi Ishida, Tokyo (JP)

(73) Assignee: NEC LCD Technologies, Ltd., Kanagawa (JP)

( * ) Notice: Subject to any disclaimer, the term of this patent is extended or adjusted under 35 U.S.C. 154(b) by 55 days.

(21) Appl. No.: 10/122,242

(22) Filed: Apr. 16, 2002

(65) Prior Publication Data
US 2002/0149719 A1 Oct. 17, 2002

(30) Foreign Application Priority Data
Apr. 17, 2001 (JP) ........................................ 2001-118013

(51) Int. Cl.⁷ ............................................. G02F 1/1333
(52) U.S. Cl. ............................. 349/60; 349/58; 349/64; 349/67; 361/681
(58) Field of Search ............................ 349/58, 59, 60, 349/64, 67; 361/681

(56) References Cited
U.S. PATENT DOCUMENTS 5,432,626 A * 7/1995 Sasuga et al. ................ 349/58
5,450,221 A * 9/1995 Owen et al. ................... 349/58
5,648,827 A * 7/1997 Shaw ........................... 349/61

FOREIGN PATENT DOCUMENTS

| JP | 11-2813 | 1/1999 |
| JP | 11-146305 | 5/1999 |
| JP | 2000-75273 | 3/2000 |
| JP | 2000-50748 | 8/2000 |
| JP | 2000-075273 | 3/2003 |

* cited by examiner

Primary Examiner—Robert H. Kim
Assistant Examiner—Michael H. Caley
(74) Attorney, Agent, or Firm—Young & Thompson

(57) ABSTRACT

In a liquid crystal display device there are provided a frame, a liquid crystal panel, and a diffuser, the liquid crystal panel and the diffuser being supported by a frame formed of a white resin. The frame is composed of two short-side members and two long-side members. The short-side members are provided with reflectors respectively, and lamp mounting members formed of rubber are fitted with the reflectors to support end portions of lamps. The lamp mounting members are mounted to a back reflector to fix the lamps to the back reflector.

16 Claims, 9 Drawing Sheets

LIQUID CRYSTAL DISPLAY DEVICE

BACKGROUND OF THE INVENTION

1. Field of the Invention

The present invention relates to a liquid crystal display device provided with a direct backlight and more particularly to a liquid crystal display device which is reduced in the number of components used.

2. Description of the Related Art

Liquid crystal display devices are used to constitute a monitor in a thin TV receiver, a stand-alone type monitor, and a monitor in a notebook-size personal computer. A conventional liquid crystal display device is made up of a backlight, a liquid crystal panel which allows light projected from the backlight to pass therethrough selectively and form an image thereon, and a housing which houses therein the backlight and the liquid crystal panel. As backlights there are an edge backlight wherein a light source such as a cold-cathode discharge tube is disposed sideways of a backlight and light emitted from the light source is conducted to a liquid crystal panel by means of a light guide plate and a direct backlight wherein a light source is disposed oppositely to a liquid crystal panel. The direct backlight, in comparison with the edge backlight, can improve the luminance of the liquid crystal panel and so is applied to a liquid crystal display device which constitutes, for example, a monitor in a high-definition type thin TV receiver.

The liquid crystal panel indicates a panel comprising a transparent substrate having switching elements such as TFTs (thin-film transistors) formed thereon, a transparent counter substrate opposed to the transparent substrate, and a liquid crystal sealed between the two substrates, with liquid crystal display portions being disposed in a matrix form, and wherein drivers are connected respectively to a scanning line and a signal line both provided in each of the liquid crystal display portions and a connecting substrate is connected to each of the drivers. The backlight indicates an integral structure of a light source, a holder for holding the light source, a reflector for reflecting light emitted from the light source toward a liquid crystal panel, and a diffuser for diffusing the light.

For example, in Japanese Patent Application Laid Open No. 2000-75273, there is disclosed a liquid crystal display device provided with a direct backlight. FIG. 1 is an exploded assembly diagram showing the construction of a conventional liquid crystal display device which is based on the technique disclosed in the above '273 publication and also in other known techniques. As shown in FIG. 1, the conventional liquid crystal display device is provided with a frame 21 of an L-shaped section and a liquid crystal panel 22 disposed so as to be surrounded with the frame 21. The liquid crystal panel 22 is made up of a display portion 22a which transmits light selectively and which colors to form an image and connecting substrates 22b which control the operation of the display portion 22a. Side portions of the display portion 22a and the connecting substrate 22b are in contact with inner surfaces of the frame 21. The connecting substrates 22b are bent at approximately right angles from the display portion 22a along inner surfaces of the frame 21. That is, the frame 21 covers side portions of one side of the display portion 22a in the liquid crystal panel 22 and also covers the connecting substrates 22b.

Further, a diffuser, 25 is provided on the liquid crystal substrate 22 on the side which is not covered with the frame 21 when viewed from the display portion 22a. The diffuser 25 is a white translucent plate formed of an acrylic resin for example and is disposed in parallel with the display portion 22a of the liquid crystal panel 22. Hereinafter, the direction toward the display portion 22a of the liquid crystal panel 22 from the diffuser 25 will be designated the surface direction, while the direction toward the diffuser 25 from the display portion 22a will be designated the back direction. When viewed in the surface direction, the frame 21, liquid crystal panel 22 and diffuser 25 are generally rectangular.

Side portions of the diffuser 25 are supported by a frame-shaped metallic chassis 26. A frame-shaped spacer 23 made of resin is disposed between the metallic chassis 26 and the display portion 22a of the liquid crystal panel 22. The spacer 23 is for preventing contact between the metallic chassis 26 and the liquid crystal panel 22 which is formed of glass and thereby preventing damage of the liquid crystal panel 22. Positioning members 27 formed of resin are attached respectively to four surface corners of the metallic chassis 26. The positioning members 27 are for positioning and fixing the liquid crystal panel 22. Between the metallic chassis 26 and the connecting substrates 22b of the liquid crystal substrate 22 is disposed an insulating member (not shown) to prevent a short between both substrates.

A back reflector 28 is disposed on the back side of the diffuser 25. The back reflector 28 may be a flat plate shape or a corrugated plate shape. A central portion and the vicinity thereof of the back reflector 28 are generally parallel to the diffuser 25. In the back reflector 28, two side portions 28a opposed to each other are bent to the surface side at an angle of larger than 0° and smaller than 90° relative to the central and nearby portion of the back reflector 28. Between the other two side portions than the side portions 28a of the back reflector 28 and the diffuser 25 are disposed side reflectors 29 respectively. The side reflectors 29 are each in a comb shape with plural cutout portions 29a formed therein.

Between the diffuser 25 and the back reflector 28 are arranged plural lamps 30 in parallel with one another. Both ends of the lamps 30 are supported by the cutout portions 29a of the side reflectors 29. That is, the lamps 30 are arranged in parallel with the side portions 28a of the back reflector 28 and are surrounded with the side portions 28a of the back reflector 28 and the side reflectors 29. In the case where the back reflector 28 is corrugated, the lamps 30 are received within troughs of the corrugation. Further, the back reflector 28 and the side reflectors 29 are received and supported inside a resin frame 31.

In Japanese Patent Application Laid Open No. Hei. 11-2813, there is disclosed a technique associated with a liquid crystal display device provided with a direct backlight, wherein semi-cylindrical reflectors are provided for linear light sources (lamps) respectively and the linear light sources and the reflectors are rendered integral with each other and are made slidable along sides and removable with respect to a frame. The reflectors function as the back reflector 28 and side reflectors 29 shown in FIG. 1. It is described therein that according to this construction the luminance of the backlight becomes uniform and the replacement of the linear light sources is easy.

Further, in Japanese Patent Application Laid Open No. Hei. 11-146305, there is disclosed a technique associated with a liquid crystal display device wherein there is provided a frame which supports a liquid crystal panel, a diffuser and a backlight, the frame being composed of two longitudinal frames, two transverse frames, and four corner members. It is described therein that according to this construction, even if the liquid crystal display device is large-sized, the cost of the frame can be suppressed by suppressing an increase in size of a molding machine for fabricating the frame and of a mold used therein.

However, the above conventional liquid crystal display devices involve the following problems. First, the liquid crystal display devices are high in cost as compared with displays using cathode-ray tubes. Therefore, the reduction of cost is keenly demanded for liquid crystal display devices. Further, there exists a recent demand for a decrease in size of liquid crystal display devices and an increase in size of a display area. To meet this demand it is required that the picture frame area not contributing to the display of image, which area is formed around the image display portion, be made as narrow as possible.

In the liquid crystal display device disclosed in the foregoing Japanese Patent Application Laid Open No. 2000-75273, a limit is encountered in attaining the reduction of cost and narrowing the picture frame because the number of components used therein is large, including the metallic chassis 26 and positioning members 27. Also in the liquid crystal display device disclosed in the foregoing Japanese Patent Application Laid Open No. Hei. 11-2813 there is the problem that the cost increases because reflectors are provided for linear light sources respectively. Further, in the liquid crystal display device disclosed in the foregoing Japanese Patent Application Laid Open No. Hei. 11-146305, it may be possible to suppress an increase in size of a molding machine for fabricating the frame and of a mold used therein, but a limit is encountered in attaining the reduction of cost because the number of components which constitute the frame is large.

SUMMARY OF THE INVENTION

It is an object of the present invention to provide a liquid crystal display device lower in cost and narrower in the picture frame area than in the conventional liquid crystal display devices.

The liquid crystal display device according to the present invention comprises plural light sources, a back reflector disposed on a back side of the liquid crystal display device to reflect light emitted from the light sources, a diffuser disposed oppositely to the back reflector with the light sources therebetween to transmit and diffuse the light emitted from the light sources, a liquid crystal panel which selectively transmits the light having passed through the diffuser, thereby forming an image, and a frame integrally provided with both a diffuser support portion for supporting the diffuser and a liquid crystal panel support portion for supporting the liquid crystal panel.

In the present invention, since the frame is provided with both a diffuser support portion which supports edge portions of the diffuser and a liquid crystal panel support portion which supports edges portions of the liquid crystal panel, it is possible to omit the positioning members, metallic chassis and resin frame which are essential components in the conventional liquid crystal display devices. Consequently, it is possible to make the number of components used smaller than in the conventional liquid crystal display devices, whereby the number of working steps in assembling the liquid crystal display device is decreased and hence it is possible to reduce the cost of the liquid crystal display device. Further, by omitting the metallic chassis, it is possible to narrow the picture frame area.

It is preferable that the light sources be mounted to the back reflector each individually and removably at both ends thereof through mounting members formed of an elastic material. In this case, since the light sources are mounted to the back reflector, when the light sources are to be replaced in the liquid crystal display device, all of the light sources can be replaced at a time by removing the back reflector. Consequently, the efficiency of the light source replacing work is improved. Besides, it is possible to cushion vibrations and impacts applied to the light sources from the exterior and thereby prevent damage of the light sources.

On the other hand, in the liquid crystal display device disclosed in the foregoing Japanese Patent Application Laid Open No. 2000-75273, when the lamps 30 (linear light sources) are to be replaced, as shown in FIG. 1, it is necessary that the integral structure comprising the resin frame 31, back reflector 28, side reflector 29, lamps 30, diffuser 25, metallic chassis 26 and positioning members 27 be removed from the liquid crystal display device, then the metallic chassis 26 and diffuser 25 be removed from the integral structure, and thereafter the lamps 30 be removed. Thus, much time and labor are required for the replacement of lamps.

In the foregoing Japanese Patent Application Laid Open No. Hei. 11-2813 is disclosed a technique for facilitating the replacement of lamps. However, the technique disclosed therein is suitable for replacing lamps one by one. However, the lamp luminance lowers with the lapse of the lamp working time, so if only one lamp is replaced in the liquid crystal display device, only the new lamp become brighter than the other lamps, resulting in that the screen luminance becomes non-uniform. Usually, therefore, all the lamps are replaced together upon exhaustion of one lamp. In the liquid crystal display device disclosed in the foregoing Japanese Patent Application Laid Open No. Hei. 11-2813, when all the lamps are to be replaced at a time, it is required that the lamps be taken out and replaced one by one, and thus the lamp replacing work becomes more troublesome. On the other hand, in the present invention, all the light sources (lamps) can be replaced at a time by removing the back reflector, so that the light source replacement can be done efficiently.

The frame may have side reflectors for reflecting light emitted from said light sources toward said liquid crystal panel. The side reflectors may be provided along inner faces of the frame, i.e., along side faces of the liquid crystal display device. With this construction, it is possible to omit the use of such independent side reflectors as are essential components in the conventional liquid crystal display devices.

The frame may be assembled in the frame shape by connecting at least two divided frames. The frame can be divided at four corners and it can be assembled in the frame shape by connecting four, substantially linear, divided frames. In this case, the work for fitting the diffuser and the back reflector in the frame becomes easier. Besides, the mold for fabricating the frame can be reduced in size and hence it is possible to decrease the cost of the liquid crystal display device.

It is preferable that the divided frames be formed by molding resin or be constituted by a resin-coated metal. Consequently, not only the molding of the divided frames becomes easy, but also it is possible to omit the spacer which is used in the conventional liquid crystal display devices for protecting the liquid crystal panel made of glass. As a result, it is possible to further decrease the number of components used and suppress the cost to a greater extent.

Further, the back reflector may comprise a metallic plate and a reflecting material coated onto the metallic plate to form a reflecting surface. As a result, it is possible to diffuse and reflect light and there can be obtained a back reflector which is thin and high in strength. As the aforesaid reflecting material there may be used, for example, a resin of a color which exhibits a reflective effect, e.g., a white resin.

Thus, according to the present invention, it is possible to provide a liquid crystal display device which is lower in cost and narrower in the picture frame area than in the conventional liquid crystal display devices.

BRIEF DESCRIPTION OF THE DRAWINGS

FIGS. 5A to 5D are plan views showing the construction of the short-side member, of which FIG. 5A is a side view, FIG. 5B is a top view, FIG. 5C is a side view orthogonal to FIG. 5A, and FIG. 5D is a side view opposite to FIG. 5A;

FIGS. 7A to 7D are plan views showing the construction of the long-side member, of which FIG. 7A is a side view, FIG. 7B is a top view, FIG. 7C is a side view orthogonal to FIG. 7A, and FIG. 7D is a side view opposite to FIG. 7A;

DETAILED DESCRIPTION OF THE PREFERRED EMBODIMENT

Figure 2:
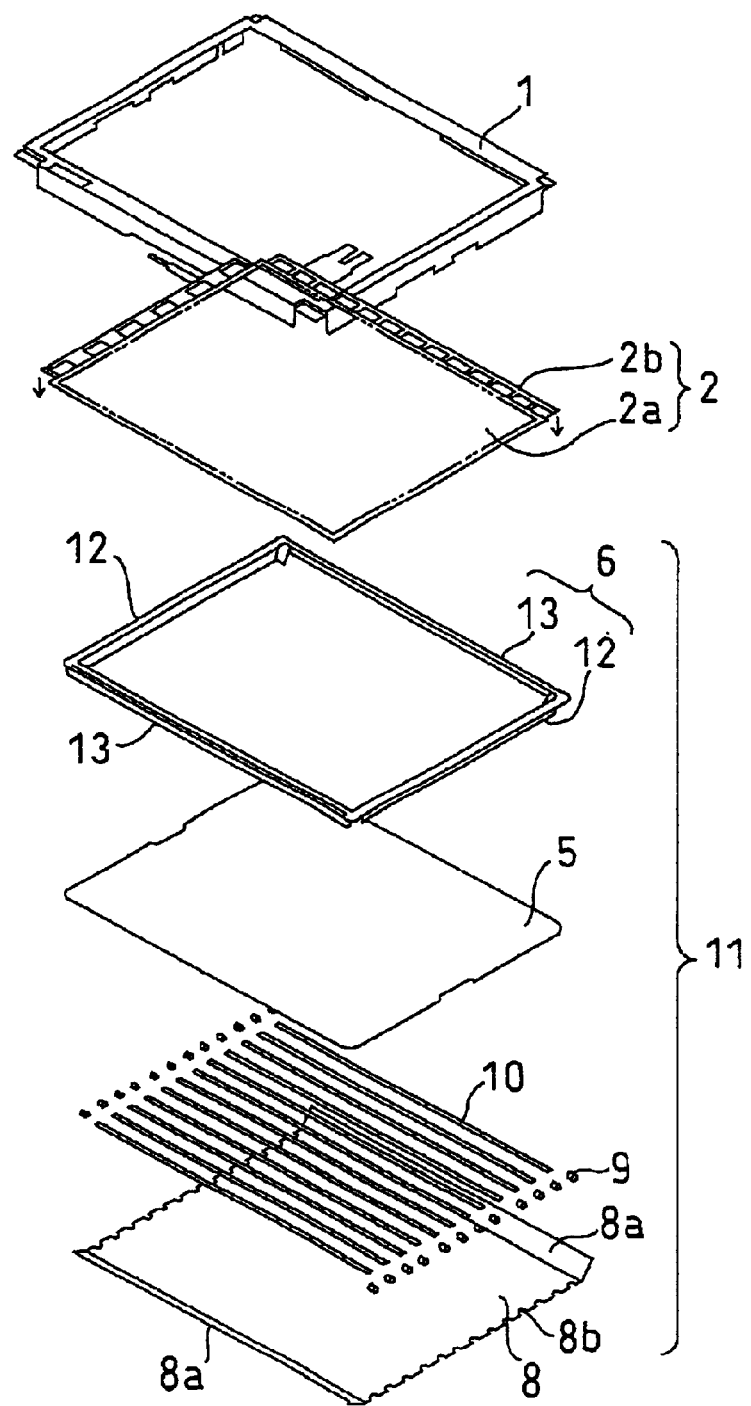
FIG. 2 is an exploded assembly diagram showing the construction of a liquid crystal display device according to an embodiment of the present invention.

An embodiment of the present invention will be described concretely with reference to the accompanying drawings. FIG. 2 is an exploded assembly diagram showing the construction of a liquid crystal display device according to this embodiment. In the liquid crystal display device of this embodiment, as shown in FIG. 2, a metallic frame 1 of an L-shaped section and a liquid crystal panel 2 are provided. The liquid crystal panel 2 is made up of a display portion 2a which transmits light selectively and which colors to form an image and connecting substrates 2b which are connected to two adjacent sides of the display portion 2a and which controls the operation of the display portion 2a. The display portion 2a is composed of two glass substrates and a polarizer affixed to the outside thereof. The display portion 2a and the connecting substrates 2b are received inside the frame 1 while the connecting substrates 2b are bent at approximately right angles from the display portion. That is, side portions of one side of the display portion 2a, as well as the connecting substrates 2b, are covered with the frame 1 of an L-shaped section.

Further, on the side where side portions of the liquid crystal panel 2 are not covered with the frame 1 when viewed from the display portion 2a there is provided a diffuser 5. The diffuser 5 is a white translucent plate formed of an acrylic resin for example and it is disposed in parallel with the display portion 2a of the liquid crystal panel 2. Hereinafter, the direction toward the display portion 2a of the liquid crystal panel 2 from the diffuser 5 will be designated the surface direction, while the direction toward the diffuser 5 from the display portion 2a will be designated the back direction.

Edges of the display portion 2a of the liquid crystal panel 2 and edges of the diffuser 5 are supported by a resin frame 6. The frame 6 is made up of two short-side members 12 and two long-side members 13. A back reflector 8 is disposed on the back side of the diffuser 5. A central and nearly portion of the back reflector 8 is substantially parallel to the diffuser 5. Two opposed side portions 8a of the back reflector 8 are bent to the surface side at an angle of larger than 0° and smaller than 90° relative to the central and nearby portion of the back reflector 8. The other two side portions than the side portions 8a of the back reflector 8 are formed with cutout portions 8b.

Figure 3:
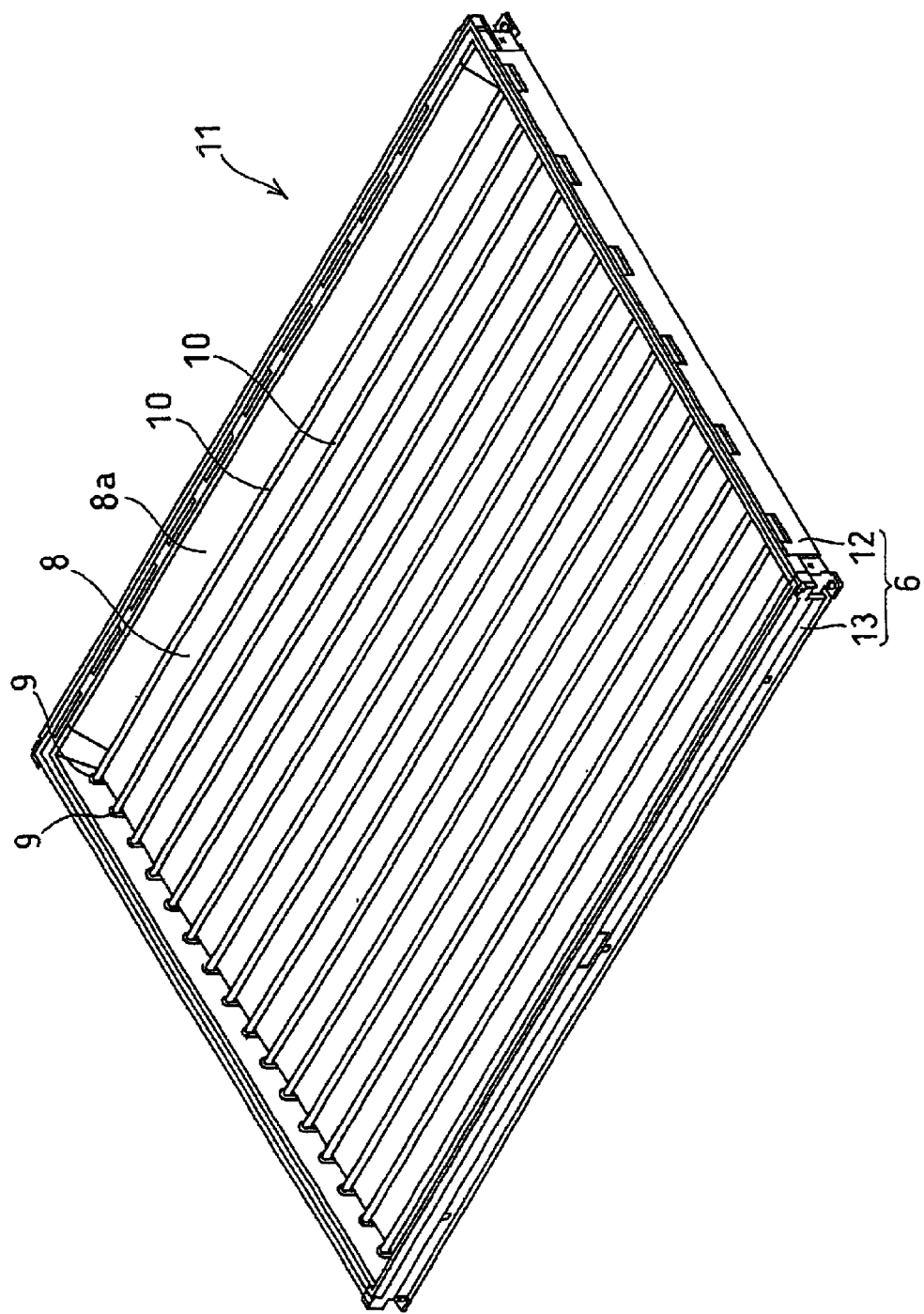
FIG. 3 is a perspective view showing the construction of a backlight used in the liquid crystal display device.

FIG. 3 is a perspective view showing the construction of a backlight 11 used in the liquid crystal display device of this embodiment. The backlight 11 includes the diffuser 5, which, however, is not shown in FIG. 3. As shown in FIGS. 2 and 3, plural lamps 10 such as cold-cathode discharge tubes, which are linear light sources, are arranged in parallel between the diffuser 5 and the back reflector 8. At both ends of each lamp 10 are provided lamp mounting members 9 formed of rubber. Each lamp mounting member 9 is formed with a cavity 9a in which an end portion of the associated lamp is fitted, as well as a portion 9b of U-shaped section, (see FIG. 9). Both ends of each lamp 10 are supported by the cavities 9a. The lamp mounting members 9 are attached to the cutout portions 8b of the back reflector 8 through their portions 9b of U-shaped section, whereby the lamps are mounted to the back reflector 8. The lamps 10 are arranged in parallel with the side portions 8a of the back reflector 8 and are surrounded by the side portions 8a of the back reflector 8 and the frame 6. The back reflector 8 is formed of resin for example and has a white surface to reflect light irregularly, provided the surface of the back reflector 8 may be a mirror surface. The back reflector is connected to the frame 1 with screws (not shown), whereby the liquid crystal display device is assembled as an integral unit. The lamps 10 used in this embodiment are cold-cathode discharge tubes. The back light 11 is constituted by the frame 6, diffuser 5, lamps 10, lamp mounting members 9 and back reflector 8.

Figure 4:
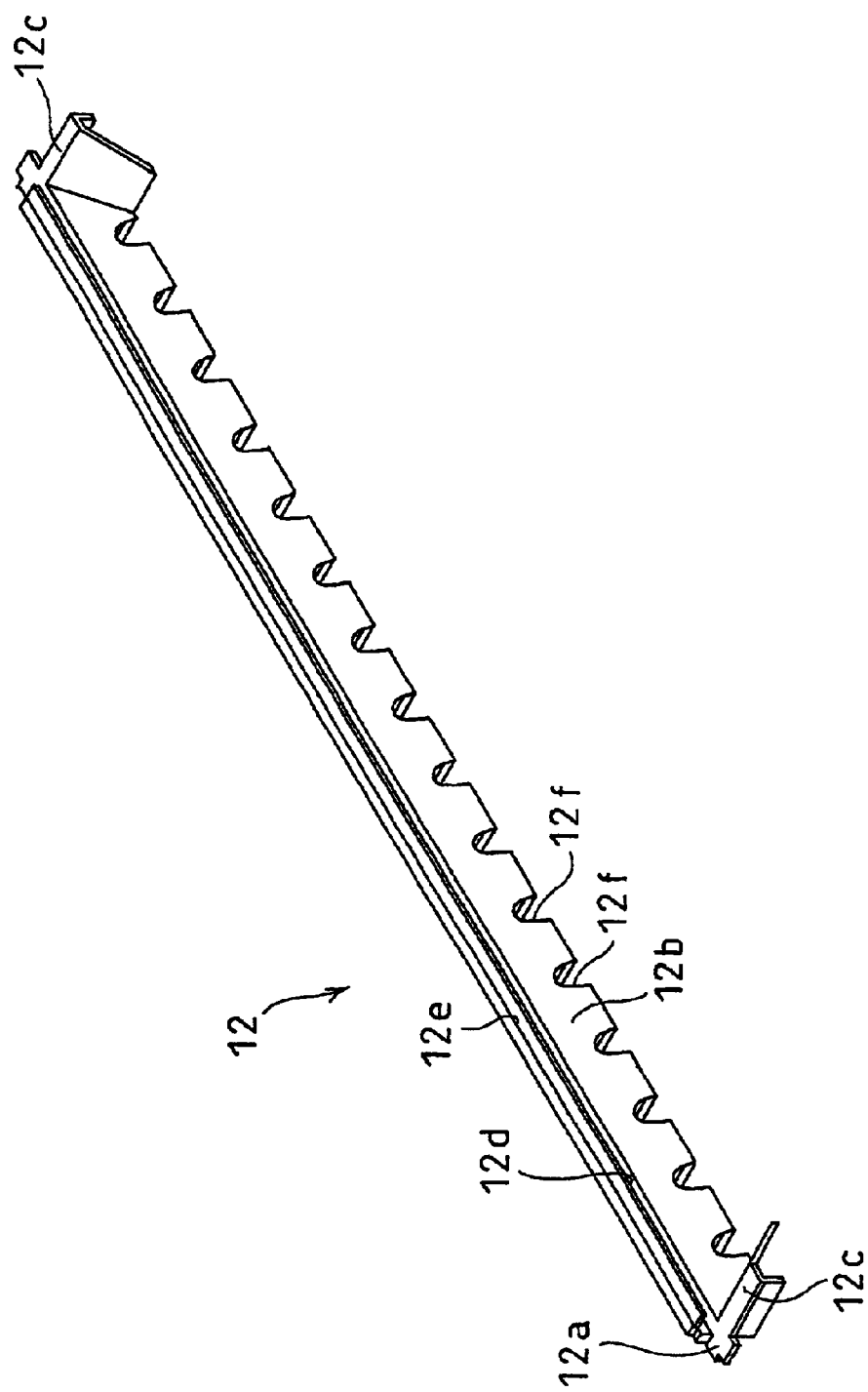
FIG. 4 is a perspective view showing the construction of a short-side member used in the liquid crystal display device.
Figure 5A:
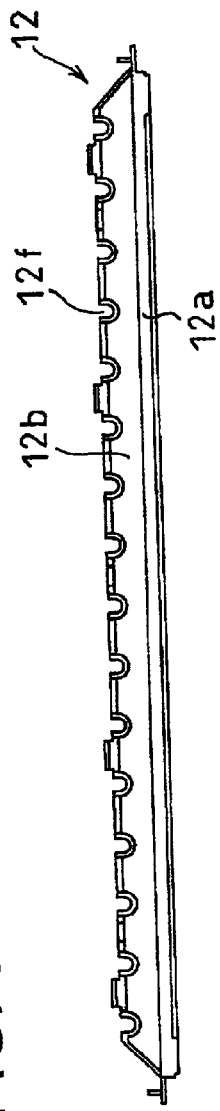
Figure 5B:
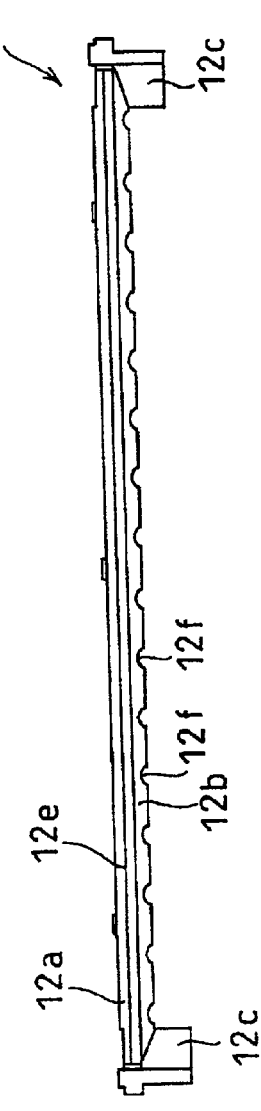
Figure 5C:
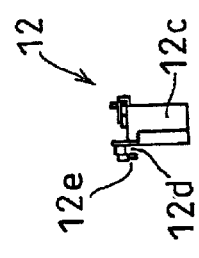
Figure 5D:
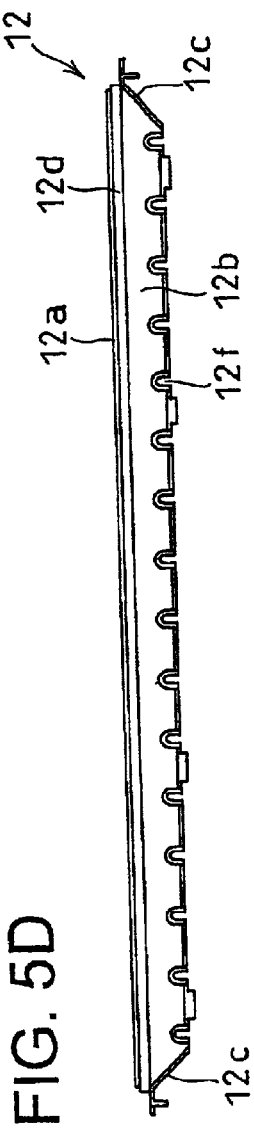

FIG. 4 is a perspective view showing the construction of each short-side member 12 used in the liquid crystal display device of this embodiment. FIGS. 5A to 5D are plan views showing the construction of each short-side member 12, of which FIG. 5A is a side view, FIG. 5B is a top view, FIG. 5C is a side view orthogonal to FIG. 5A, and FIG. 5D is a side view opposite to FIG. 5A. As shown in FIGS. 4 and 5A to 5D, each short-side member 12 is made up of a top plate 12a extending in the longitudinal direction of the short-side member 12 and parallel to the liquid crystal panel 2, a reflector 12b also extending longitudinally and inclined at an angle of larger than 0° and smaller than 90° relative to the top plate 12a, and connections 12c provided at both longitudinal ends of the short-side member 12. A groove 12d extending in the above longitudinal direction is formed in the top plate 12a and a stepped portion 12e also extending in the longitudinal direction is formed on the groove 12d. An edge of the diffuser 5 is fitted in the groove 12d, whereby the groove supports the diffuser 5. The stepped portion 12e is a portion in which a polarizer (not shown) of the liquid crystal panel 2 is received. In a lower end of the reflector 12b are formed plural recesses 12f in a row which recesses extend through the short-side member 12. As noted earlier, the reflector 12b is inclined relative to the top plate 12a and the short-side member 12 is formed by molding a white resin, so that the reflector 12b can reflect light from the lamps 10 toward the liquid crystal panel 2. That is, the reflector 12b functions as a side reflector. The lamp mounting members 9 (see FIG. 3) are fitted in and held by the recesses 12f. Further, the connections 12c are connected to the long-side members 13 and side portions 8a of the back reflector 8.

Figure 6:
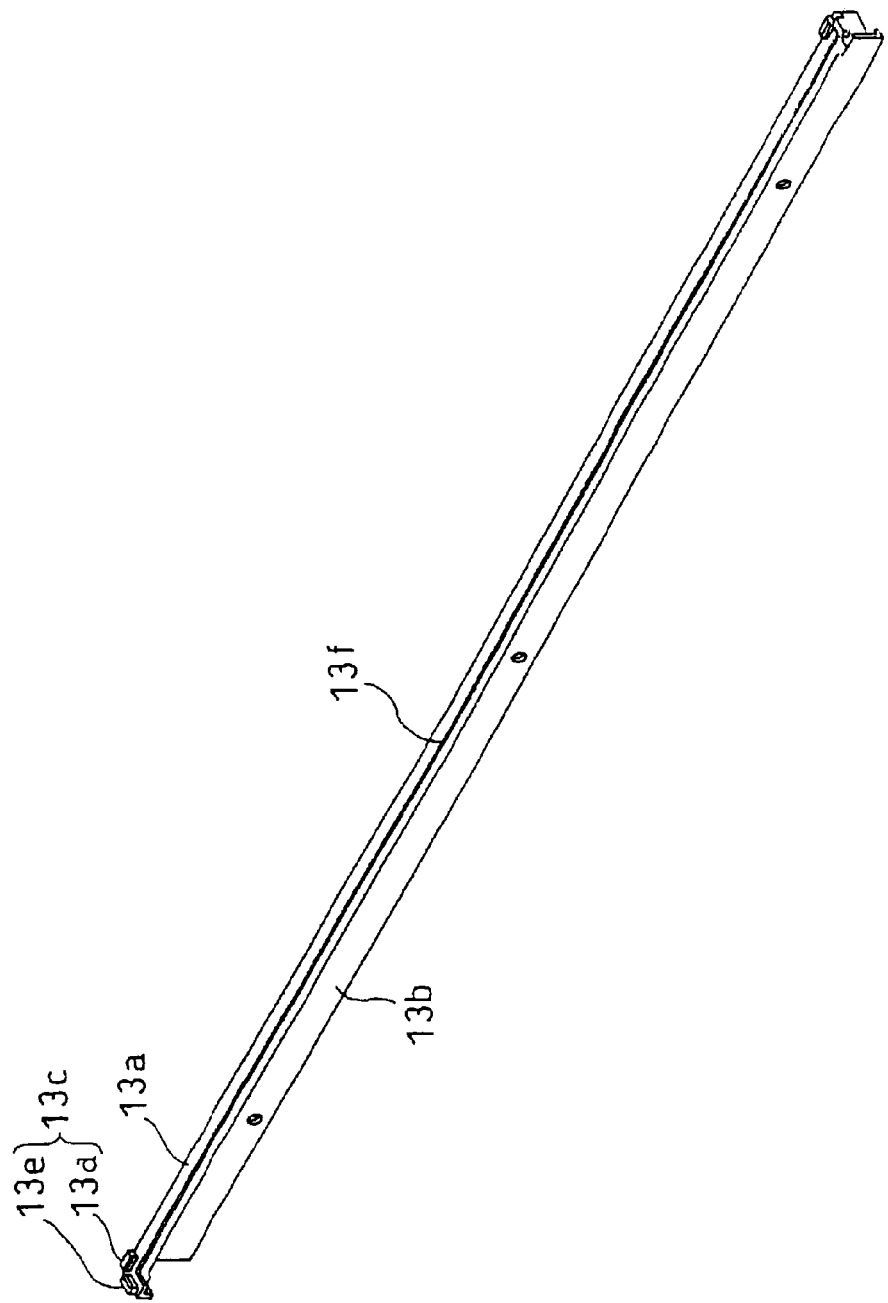
FIG. 6 is a perspective view showing the construction of a long-side member used in the liquid crystal display device.
Figure 7A:
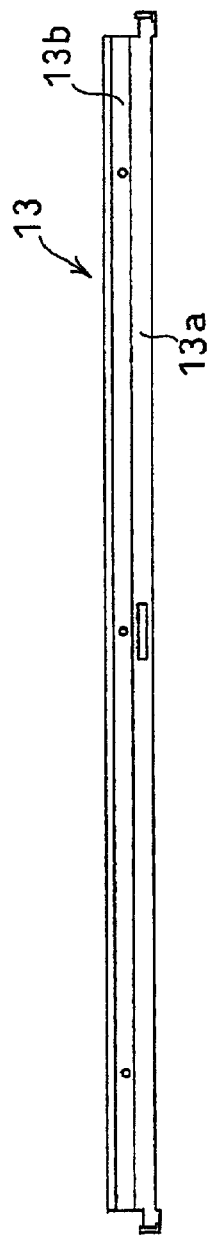
Figure 7B:
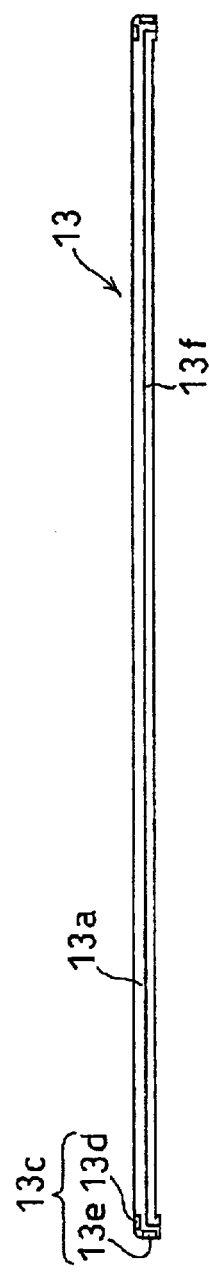
Figure 7C:
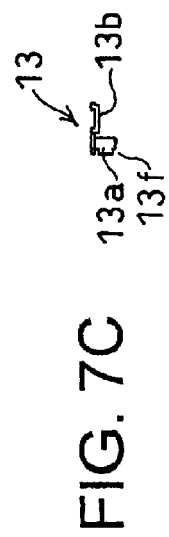
Figure 7D:
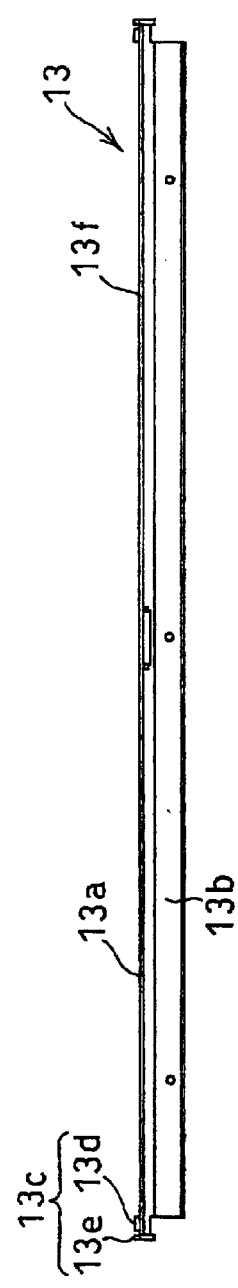

FIG. 6 is a perspective view showing the construction of each long-side member 13 used in the liquid crystal display device of this embodiment. FIGS. 7A to 7D are plan views showing the construction of the long-side member, of which FIG. 7A is a side view, FIG. 7B is a top view, FIG. 7C is a side view orthogonal to FIG. 7A, and FIG. 7D is a side view opposite to FIG. 7A. As shown in FIGS. 6 and 7A to 7D, the long-side member 13 comprises a top plate 13a and a side plate 13b both extending in the longitudinal direction of the long-side member. A section of the long-side member 13 orthogonal to the longitudinal direction is L-shaped. The top plate 13a of the long-side member 13 is formed with projections 13c at both longitudinal ends thereof. Each projection 13c is composed of two projections which are a projection 13d extending in the longitudinal direction and a projection 13e extending in a direction orthogonal to the longitudinal direction. The projections 13c are for positioning and fixing the liquid crystal panel 2. The top plate 13a has a stepped portion 13f extending in the longitudinal direction. The long-side member 13 is formed by molding resin.

Figure 8:
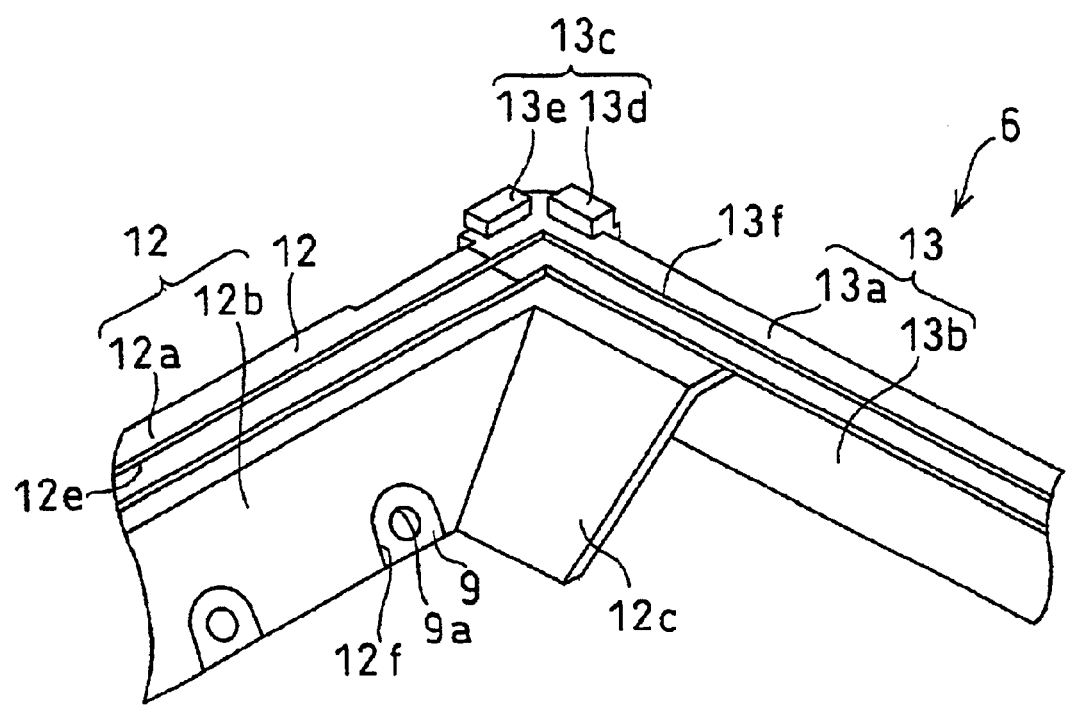
FIG. 8 is a perspective view showing the construction of a joint portion between the short- and long-side members and the vicinity thereof.

FIG. 8 is a perspective view showing the construction of a joint portion between each short-side member 12 and a long-side member 13 and the vicinity thereof. As shown in the same figure, a longitudinal end of the top plate 12a of the short-side member 12 and the connection 12c are connected to the top plate 13a of the long-side member 13. The stepped portion 12e of the short-side member 12 is connected to the stepped portion 13f of the long-side member 13 to afford a continuous stepped portion. Further, the projection 13c which comprises the projections 13d and 13e is disposed on the surface of a corner portion of the frame 6 which corner portion is constituted by connection between the short- and long-side members 12, 13. The liquid crystal panel 2 (see FIG. 2) is positioned and supported by both the continuous stepped portion and the projection 13c, the continuous stepped portion being constituted by the stepped portions 12e and 13f. Further, the connection 12c is connected to a side portion 8a (see FIG. 3) of the back reflector 8. Recesses 12f are formed in the reflector 12b of the short-side member 12 and the lamp mounting members 9 formed with cavities 9a are fitted in the recesses 12f.

Figure 9:
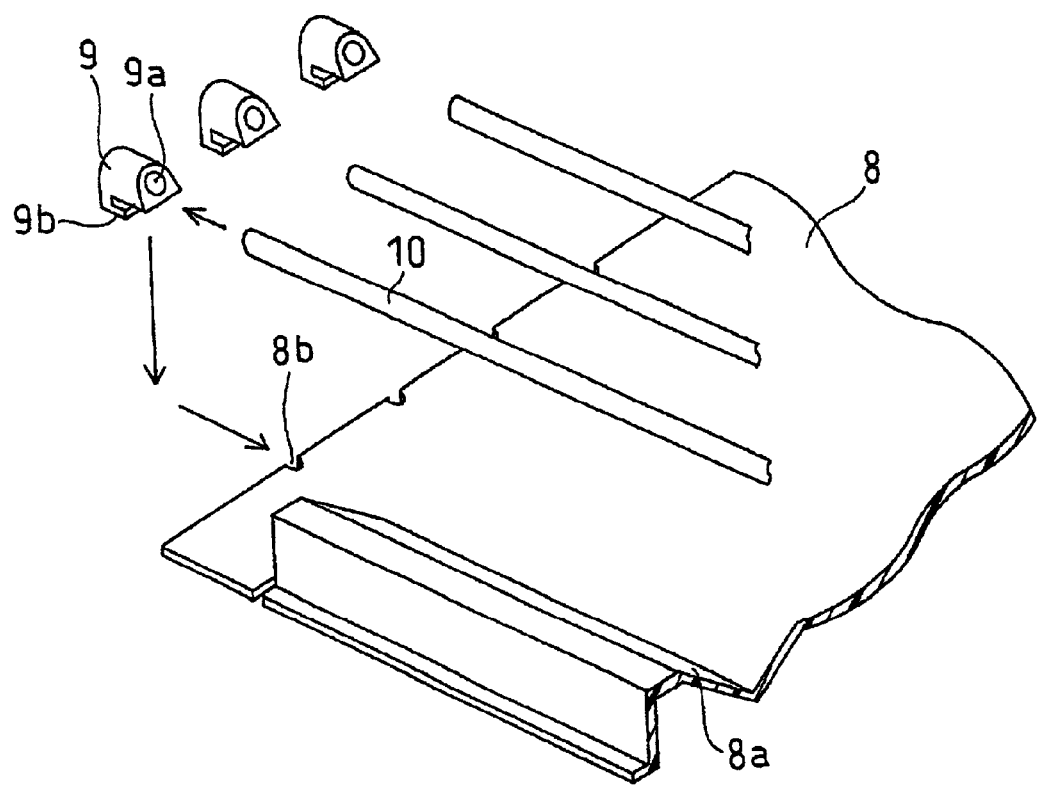
FIG. 9 is a perspective view showing the construction of a back reflector, lamp mounting members and lamps used in the liquid crystal display device.

FIG. 9 is a perspective view showing the construction of the back reflector 8, lamp mounting members 9 and lamps 10. As shown in the same figure, plural cutout portions 8b are formed at equal intervals in an edge portion of the back reflector 8. The lamp mounting members 9 are each provided with the cavity 9a and the U-section portion 9b. The U-section portion is internally provided with a convex portion (not shown) for fitting in the associated cutout portion 8b. By fitting this convex portion into the associated cutout portion 8b it is possible to effect positioning of each lamp mounting member 9.

The lamps 10, which are cold-cathode discharge tubes, are fitted at their end portions into the cavities 9a of the lamp mounting members 9. By fitting the U-section portions 9b on the back reflector 8 at the position where the cutout portions 8b are formed in the back reflector, the lamp mounting members 9 are positioned and mounted to the back reflector 8. As a result, the lamps 10 are fixed to the back reflector 8. Wires (not shown) are drawn out from both ends of the lamps 10 and are each connected to an external power supply (not shown) through an inverter (not shown).

The operation of the liquid crystal display device of this embodiment will now be described. When electric power is fed to the lamps 10 shown in FIG. 2, the lamps 10 emit light. The light emitted from the lamps 10 is incident on the diffuser 5 directly or after being reflected by the back reflector 8. The light thus incident on the diffuser 5 passes through the diffuser and is thereby diffused and rendered uniform, then enters the display portion 2a of the liquid crystal panel 2. The display portion 2a, which is controlled by the connecting substrate 2b, transmits the incident light selectively and colors. As a result, an image is formed on the surface side of the display portion 2a.

Figure 1:
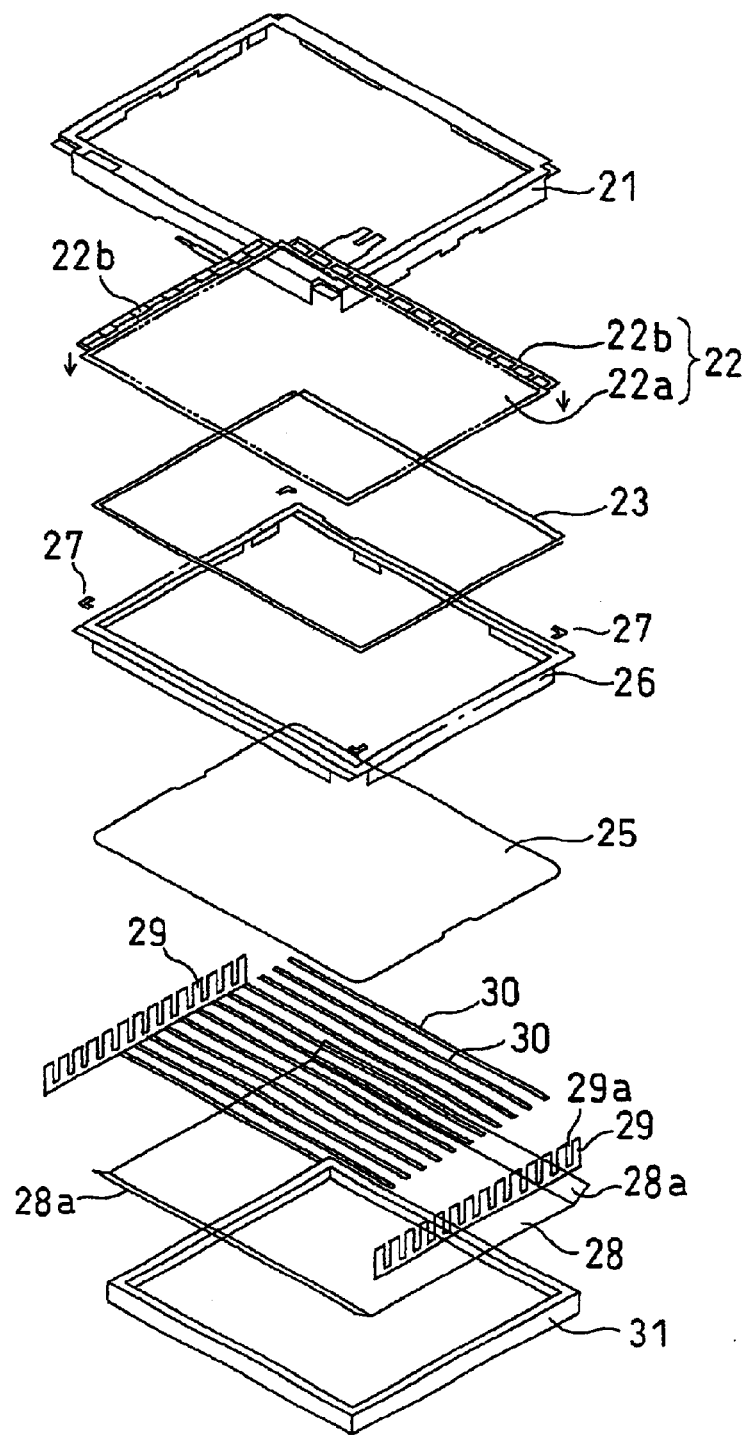
FIG. 1 is an exploded assembly diagram showing the construction of a conventional liquid crystal display device.

In the liquid crystal display device of this embodiment, since the grooves 12d and projections 13c are formed in the frame 6, it is possible to effect positioning of the diffuser 5 and the liquid crystal panel 2 and support them. Consequently, it is possible to omit the positioning members, metallic chassis and resin frame (see FIG. 1) which are used in the conventional liquid crystal display devices. Besides, since the reflectors 12b are provided in the frame 6 and the lamps 10 are mounted to the back reflector 8, it is possible to omit the side reflectors (see FIG. 1) used in the conventional liquid crystal display devices, whereby the number of components of the liquid crystal display device can be decreased. Thus, by decreasing the number of components used it becomes easier to assemble the liquid crystal display device. Since the number of components used becomes smaller and the assembling work becomes easier, the cost of the liquid crystal display device is reduced. Moreover, since the metallic chassis and resin frame can be omitted, it is possible to narrow the picture frame area.

In the liquid crystal display device of this embodiment, the lamps 10 are mounted to the back reflector 8, so at the time of replacement of the lamps 10, all the lamps can be replaced at a time by removing the back reflector 8. As a result, the efficiency of the lamp replacing work is improved.

Further, in the liquid crystal display device of this embodiment, since the lamps 10 are mounted to the back reflector 8 through the lamp mounting members 9 formed of rubber, it is possible to cushion external vibrations and shocks and thereby prevent damage of the lamps 10. In the conventional method of forming cutout portions in the side reflectors to support the lamps, an increase in the number of the cutout portions results in a lowering in strength of the side reflectors and a narrowing of the reflection area on the side reflectors, so it is impossible to use many lamps in the liquid crystal display device. On the other hand, in this embodiment according to the present invention, the number of the lamps 10 can be made larger than in the prior art because the lamps 10 are supported by the lamp mounting members 9. Consequently, it is possible to improve the brightness of the display portion 2a and widen the brightness adjusting range. Besides, by increasing the number of lamps 10 it is possible to improve the luminance uniformity, whereby it is possible to shorten the distance between the lamps 10 and the liquid crystal panel 2 and hence possible to thin the liquid crystal display device.

Further, in the liquid crystal display device of this embodiment, since the frame 6 is formed of resin, there is no fear damage to the display portion 2a even if the frame 6 should contact the display portion 2a of the liquid crystal panel 2 which is made of glass. Therefore, it is possible to omit the spacer (see FIG. 1) which is used in the conventional liquid crystal display devices. As a result, it is possible to further decrease the number of components used and further reduce the cost. Moreover, since the frame 6 is formed of resin, it is not necessary to provide an insulating member between the connecting substrates 2b of the liquid crystal panel 2 and the frame 6, nor is it necessary to cover wires (not shown) for the lamps 10 with an insulating film, thus permitting a further reduction of cost.

Further, since the frame 6 is composed of two short-side members 12 and two long-side members 13, the work of mounting the liquid crystal panel 2, diffuser 5 and back reflector 8 for the frame 6 in assembling the liquid crystal display device becomes easier. Moreover, the mold for fabricating the frame 6 can be reduced in size, thus permitting a further reduction of cost. Since the frame 1 is formed of metal, it is possible to impart shieldability to the frame 1.

Although the frame 6 used in this embodiment is constituted by short- and long-side members 12, 13, the frame 6 may be an integrated member, whereby the number of components used in the liquid crystal display device can be further decreased although the mold for fabricating the frame 6 becomes larger in size. Although the back reflector 8 used in this embodiment is formed of resin, it may be formed of metal or may comprise a metal such as aluminum or aluminum alloy and a white resin coated thereon. Although the lamp mounting members 9 used in this embodiment are formed of rubber, they may be formed of another material. By forming the lamp mounting members with use of a material superior in thermal conductivity, heat can be radiated efficiently from the lamps 10.

In the present invention the spacing between adjacent cutout portions 8b can be set narrower than the spacing of lamps in the conventional liquid crystal display devices, so the cutout portions 8b in the back reflector 8 may be formed beforehand in a larger number than the number of lamps 10, whereby an appropriate number and layout of lamps 10 can be selected at the time of assembling the liquid crystal display device. It is also easy to change the number and layout of lamps 10 after the liquid crystal display device has been used for a certain period of time. Further, the lamp mounting members 9 may be mounted to the back reflector 8 by fitting without forming the cutout portions 8b in the back reflector. By so doing, it is possible to set a desired fitting position of the lamp mounting member 9 for the back reflector 8 and therefore the number and position of lamps 10 can be set arbitrarily. Therefore, when lamps are to be replaced due to deterioration with time after the use of the liquid crystal display device, the number and position of lamps can be altered easily with respect to their initial number and position. Further, although in this embodiment the back reflector 8 is connected with screws to the frame 1, the back reflector may be connected to the frame 1 by fitting or by the use of a double-coated adhesive tape or the like.

What is claimed is:

1. A liquid crystal display device comprising:
   a plurality of light sources;
   a back reflector disposed on a back side of the liquid crystal display device to reflect light emitted from said light sources;
   a diffuser disposed oppositely to said back reflector with said light sources therebetween to transmit and diffuse the light emitted from the light sources;
   a liquid crystal panel which selectively transmits the light having passed through said diffuser, thereby forming an image;
   a frame integrally provided with both a diffuser support portion for supporting said diffuser and a liquid crystal panel support portion for supporting said liquid crystal panel; and
   a plurality of mounting members formed of an elastic material and mounted directly at side edge portions of the back reflector, said light sources being individually and removably mounted at both extreme ends thereof to a respective side edge portion of said back reflector through said mounting members.

2. A liquid crystal display device according to claim 1, wherein said mounting members are formed of rubber or resin.

3. A liquid crystal display device according to claim 1, further comprising side reflectors reflecting light emitted from said light sources toward said liquid crystal panel, being provided along inner faces of said frame, i.e., along side faces of the liquid crystal display device.

4. A liquid crystal display device according to claim 1, wherein said frame is assembled in the frame shape by connecting at least two divided frames.

5. A liquid crystal display device according to claim 4, wherein said frame can be divided at four corner portions and is assembled in the frame shape by connecting four, substantially linear, divided frames.

6. A liquid crystal display device according to claim 5, wherein said divided frames are connected together by fitting respective end portions with each other.

7. A liquid crystal display device according to claim 4, wherein said divided frames are connected together by fitting respective end portions with each other.

8. A liquid crystal display device according to claim 4, further comprising side reflectors reflecting light emitted from said light sources toward said liquid crystal panel, wherein two of said divided frames are provided oppositely to each other, and said two divided frames are integral with two of said side reflectors respectively.

9. A liquid crystal display device according to claim 8, wherein said two side reflectors integral with said divided frames are formed with recesses for fitting therein of said mounting members.

10. A liquid crystal display device according to claim 8, wherein remaining of said side reflectors which is not integral with said divided frames are formed integrally with said back reflector so as to stand up from the back reflector and being provided oppositely to each other and connected to said two side reflectors which is integral with said divided frames.

11. A liquid crystal display device according to claim 4, wherein said divided frames are formed by molding resin.

12. A liquid crystal display device according to claim 4, wherein said divided frames are formed using a resin-coated metal.

13. A liquid crystal display device according to claim 1, wherein said back reflector is constituted by coating an upper surface of a metallic plate with a reflective material to form a reflective surface on the metallic plate.

14. A liquid crystal display device according to claim 1, wherein said frame is fixed to said back reflector removably.

15. A liquid crystal display device according to claim 1, further comprising a second frame for fixing said liquid crystal panel to said frame.

16. A liquid crystal display device according to claim 1, wherein said mounting members each have a portion of U-shaped section for fitting with said respective side edge portion of said back reflector and a cavity into or through which an end portion of each said light source is inserted.

* * * * *